Sept. 27, 1955     A. SCHWINGER     2,718,844
COFFEE PERCOLATOR
Filed Dec. 31, 1952
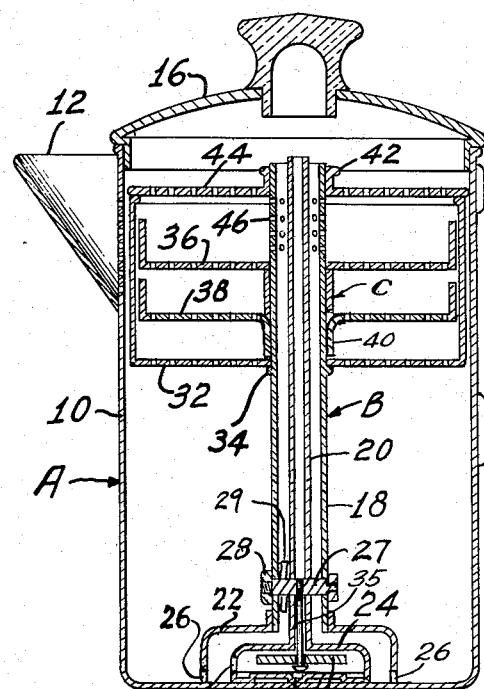
Fig. 2
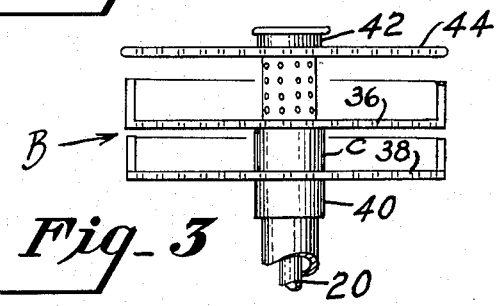
Fig. 3
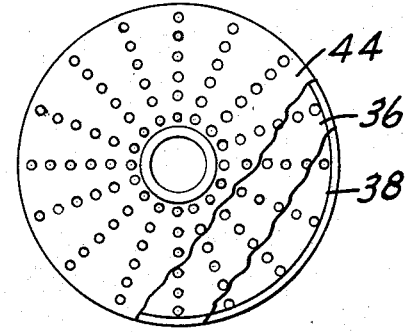
Fig. 4
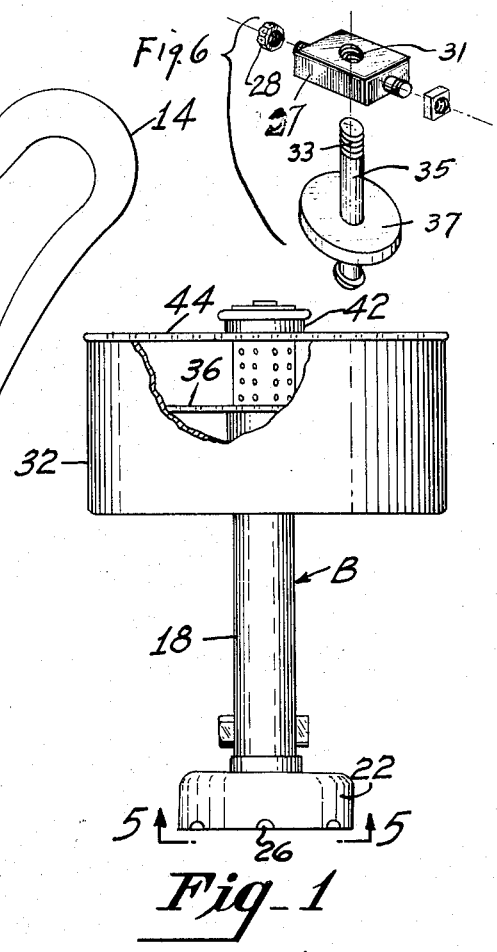
Fig. 6
Fig. 1
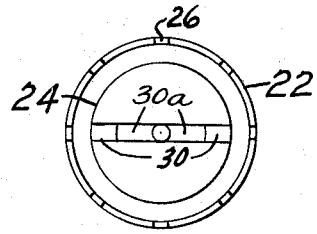
Fig. 5
INVENTOR.
Abram Schwinger
BY Harry Langsam
ATTORNEY

United States Patent Office 2,718,844
Patented Sept. 27, 1955

2,718,844

COFFEE PERCOLATOR

Abram Schwinger, Philadelphia, Pa.

Application December 31, 1952, Serial No. 328,857

2 Claims. (Cl. 99—298)

This invention relates to coffee-makers, and relates particularly to that type of coffee-maker wherein heated water is percolated through a bed of coffee-grounds.

It is well known that all the deleterious effects associated with coffee are due to the presence of caffeine. A large part of the caffeine present in coffee made in the conventional manner is due to the steeping of the coffee grounds in the water.

It is one object of my invention to provide a coffee-maker which prevents the excessive accumulation of caffeine in coffee which is made therein.

Another object of my invention is to provide a coffee-maker wherein a minimum amount of coffee grounds is required to make coffee.

In my invention coffee is brewed faster, nearly twice as fast as in the prior art coffee pots. Furthermore the coffee is given a better taste and uses a smaller quantity of coffee than heretofore.

Since each layer of coffee is very thin and with the water percolating very fast the coffee grinds will be thoroughly saturated with the result that less coffee is used and it produces a better flavor.

Other objects of my invention are to provide an improved coffee-maker of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing in which:

Fig. 1 is a fragmentary side elevational view of the percolator assembly.

Fig. 2 is a side sectional view of the percolator assembly enclosed within a coffee pot.

Fig. 3 is an elevational view of the top portion of the percolator stem and its associated parts.

Fig. 4 is a fragmentary plan view of the perforated coffee-grounds holding plates and coffee-grounds container lid.

Fig. 5 is a bottom plan view of the percolator assembly.

Fig. 6 is a perspective view of a rectangular fastening rod, or complementary holding bolt, and a slidable disc washer.

Referring now in greater detail to the drawing wherein similar reference characters refer to similar parts, I show a coffee-pot, generally designated as A, and a percolator assembly, generally designated as B, within the coffee-pot.

The percolator B comprises a pair of concentric tubes 18 and 20, the tube 20 being positioned within the tube 18. The tube 18 is provided with a base 22 which overlies a concentric base 24 integral with tube 20. Semi-circular cut-out portions 26 are formed in the bottom periphery of the base 22. The two concentric tubes 18 and 20 are held in spaced relationship to each other by means of a rectangular bolt 27 and a nut 28 holding a spacer 29 between the two tubes.

The rectangular bolt 27 has a tapped hole 31 in the center thereof which is adapted to receive the threaded end 33 of a long bolt 35 which is within the tube 20. A slidable disc washer 37 is adapted to close intermittently the opening of the tube 20 when water boils so that the greater portion of the water rushes into the tube 18 to accelerate the movement of boiling water over the coffee grounds to provide a better taste to the coffee. It also brews the coffee faster.

Complementary rectangular holes (not shown) in the tubes 18 and 20 enable the rectangular bolt to pass through in a predetermined position.

The base 24 fits within the opening in the bottom of base 22 and is spaced from the bottom of the coffee-pot by feet 30 integral therewith, the feet 30 being joined by a web 30A. The bottom of base 24 is open on either side of the web 30A, the opening extending through the lowermost sides of the base 24 to permit water to flow into tube 20. A lateral water inlet port 24A is also provided in the base 20 as shown in Fig. 2.

A cup-shaped coffee-grounds container 32 surrounds the top of the tube 18, and is held in position by a flange 34 on the tube. The concentric tubes 18 and 20 extend through a central opening in the container 32 to a position slightly above the rim of the container, the inner tube 20 extending above the outer tube 18.

The bottom of the coffee-grounds container 32 is perforated to form one foraminous shelf and within the container 32 are provided two more perforated shelves 36 and 38. The shelves 36 and 38 are integral with a sleeve 40, this sleeve being adapted to fit over the tube 18 within the confines of the container 32. The sleeve 40 and its shelves 36 and 38 form a unit generally designated as C. A second sleeve 42 is provided around the upper portion of tube 18 and this sleeve is integral with a perforated lid 44 for closing the top of the container 32. The tube 18 is perforated adjacent its top as at 46.

In operation, the coffee pot A is partially filled with water to be heated. The container 32 is then filled with coffee grounds by removing the lid 44 and the unit C comprising the sleeve 40 with its shelves 36 and 38. The coffee grounds are laid on the bottom of container 32 to a level not exceeding the level of the bottom of shelf 38 when unit C is in position. The coffee-grounds are then laid in a thin layer over both the shelves 36 and 38 and the unit C is then inserted over the tube 18 within the container 32, after which the lid 44 is replaced. The layer of coffee grounds does not exceed the level of the bottommost hole 46 in the tube 18. The entire coffee-grounds unit B is then inserted into the coffee-pot which is then heated.

As the water within the coffee-pot is heated, it percolates through the tubes 18 and 20 by entering the openings 26 formed in the base 22 and by entering the open bottom end of the tube 20 through the lateral inlet port 24A and through the spaces formed on either side of the web 30A. As the water rises in the tubes 18 and 20 it flows out of the open top of the tube 20 and through the perforations 46 in the tube 18. The water from the top of the tube 20 flows onto the perforated lid 44, while the water from the tube 18 flows through the perforations 46 onto the coffee-grounds on the shelf 36 and therethrough to the shelf 38. When the water reaches the boiling point, there is a tendency for the washer 37 to move upwardly in an intermittent manner against the base 24 whereby the flow of water through the tube 20 is limited. This construction accelerates the movement of boiling water over the coffee grounds to provide a better taste to the coffee. The water, therefore, flows both directly and indirectly onto the coffee-grounds containing shelves instead of passing through other barriers where some of its heat is lost.

In this way, the heated water is enabled to extract the full essence of the coffee which cannot, otherwise, be accomplished by the percolation method. If desired, the perforations 46 can be extended down the tube 18 and the sleeve 40 also perforated so that not only shelf 36 but also shelf 38 will get instant contact with the heated water. The straight cross-sectional contour of the coffee-grounds shelves enable a thin film of coffee grounds to be evenly distributed thereon.

Although my invention has been described in considerable detail, such description is intended as being illustrative rather than limiting, since the invention may be variously embodied, and the scope of the invention is to be determined as claimed.

I claim as my invention:

1. A coffee-making device comprising a container for holding water, a coffee-grounds receptacle within said container, said receptacle being mounted on an upstanding tube, said tube having a base at one end and being open at its other end, said tube being perforated adjacent its open end, said tube, further, extending through an opening in said receptacle, its perforated end extending beyond said receptacle, a sleeve surrounding said tube within the confines of said receptacle, a pair of spaced, perforated shelves being integral with said sleeve, a second tube concentrically positioned within and spaced from said first tube, said second tube having a base concentric with the base of said first tube, said second base also being hollow and having a bottom opening therein, said first and second bases being, further, provided with openings, whereby lateral water inlets are provided.

2. The device of claim 1 wherein said shelves have a cross-sectionally straight contour.

References Cited in the file of this patent

UNITED STATES PATENTS

| | | |
|---|---|---|
| 105,051 | Dodge | July 5, 1870 |
| 783,525 | James | Feb. 28, 1905 |
| 1,009,142 | Ferrall | Nov. 21, 1911 |
| 1,231,641 | Parent | July 3, 1917 |
| 1,944,303 | Rush | Jan. 23, 1934 |

FOREIGN PATENTS

| | | |
|---|---|---|
| 1,816 | Great Britain | 1865 |